US012287825B1

(12) United States Patent
Wu et al.

(10) Patent No.: US 12,287,825 B1
(45) Date of Patent: Apr. 29, 2025

(54) ON-DEMAND IMAGE LAYER RETRIEVAL

(71) Applicant: International Business Machines Corporation, Armonk, NY (US)

(72) Inventors: Hao Wu, Wu (CN); Xiao Ling Chen, Beijing (CN); Si Yu Chen, Beijing (CN); Lu Yan Li, Beijing (CN); Min Cheng, Beijing (CN); Wen Qi Wq Ye, Beijing (CN); Xiao Xuan Fu, Wuhan (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/396,767

(22) Filed: Dec. 27, 2023

(51) Int. Cl.
*G06F 9/455* (2018.01)
*G06F 16/535* (2019.01)
*G06F 16/55* (2019.01)
*G06F 16/901* (2019.01)

(52) U.S. Cl.
CPC .......... *G06F 16/55* (2019.01); *G06F 9/45558* (2013.01); *G06F 16/535* (2019.01); *G06F 16/9024* (2019.01)

(58) Field of Classification Search
CPC .... G06F 16/55; G06F 16/535; G06F 16/9024; G06F 9/45558
See application file for complete search history.

(56) References Cited

U.S. PATENT DOCUMENTS

| 8,843,903 | B1 * | 9/2014 | Blaser ........................ G06F 8/61 |
| | | | 717/135 |
| 10,296,219 | B2 * | 5/2019 | Wang ................... G06F 16/1748 |
| 10,303,657 | B2 | 5/2019 | Huang |
| 10,515,192 | B2 * | 12/2019 | Wang ..................... G06F 16/128 |
| 10,534,671 | B1 * | 1/2020 | Zhao ................... G06F 9/45558 |
| 10,656,865 | B1 * | 5/2020 | Janse van Rensburg ..................... |
| | | | G06F 3/061 |
| 10,719,612 | B2 | 7/2020 | Stopel |
| 10,885,378 | B2 * | 1/2021 | Li .......................... G06T 1/0007 |
| 10,936,293 | B2 * | 3/2021 | Varadharajan Kannan ................. |
| | | | G06F 8/71 |

(Continued)

FOREIGN PATENT DOCUMENTS

| CN | 106227579 A | 12/2016 |
| CN | 113420292 A | 9/2021 |

(Continued)

OTHER PUBLICATIONS

Chen et al., "Dependency Based Application Deployment", U.S. Appl. No. 18/334,511, filed Jun. 14, 2023, 50 pages. (Specs + Drawings).

(Continued)

*Primary Examiner* — Jorge A Casanova
(74) *Attorney, Agent, or Firm* — Michael O'Keefe

(57) ABSTRACT

Embodiments of the present invention provide computer-implemented methods, computer program product, and computer systems. One or more processors assign an identifier that specifies a number of resources and a category associated with a respective image layer of a plurality of image layers. One or more processors, in response to receiving a user request, identify image layers of the plurality of image layers that match the identifier based on dependencies between the plurality of image layers. One or more processors can retrieve matched layers based on the functionality of respective image layers and the dependencies of those respective image layers.

14 Claims, 9 Drawing Sheets

(56) References Cited

U.S. PATENT DOCUMENTS

| | | | |
|---|---|---|---|
| 11,782,588 B1* | 10/2023 | Bachmann | G06F 3/04842 702/5 |
| 2004/0117358 A1* | 6/2004 | von Kaenel | G06Q 40/08 |
| 2015/0033229 A1* | 1/2015 | Tegtmeier | H04L 41/08 718/1 |
| 2017/0068676 A1* | 3/2017 | Jayachandran | G06F 16/125 |
| 2017/0264684 A1* | 9/2017 | Spillane | G06F 16/128 |
| 2018/0275987 A1* | 9/2018 | Vandeputte | G06F 9/44 |
| 2018/0276215 A1* | 9/2018 | Chiba | H04L 67/51 |
| 2019/0339889 A1* | 11/2019 | Lu | G06F 3/0647 |
| 2020/0142680 A1 | 5/2020 | Varadharajan Kannan | |
| 2020/0356387 A1 | 11/2020 | Anwar | |
| 2023/0065087 A1* | 3/2023 | Punathil | G06F 8/65 |
| 2023/0229354 A1* | 7/2023 | Pabón | G06F 3/0604 711/154 |
| 2023/0229355 A1* | 7/2023 | Vohra | G06F 3/067 711/154 |
| 2023/0229561 A1* | 7/2023 | Iyer | G06F 11/0793 711/162 |
| 2023/0229567 A1* | 7/2023 | Pabón | G06F 11/1469 714/6.3 |
| 2023/0401050 A1* | 12/2023 | Sree Prakash | G06F 9/455 |
| 2024/0086168 A1* | 3/2024 | Douglas | G06F 9/45558 |
| 2024/0118916 A1* | 4/2024 | Wang | H04L 9/088 |
| 2024/0184558 A1* | 6/2024 | Chen | G06F 8/71 |
| 2024/0211231 A1* | 6/2024 | Shah | G06F 9/45558 |
| 2024/0345930 A1* | 10/2024 | Karr | G06F 11/0772 |

FOREIGN PATENT DOCUMENTS

| | | |
|---|---|---|
| EP | 3211859 A1 | 8/2017 |
| EP | 4068091 A1 | 10/2022 |

OTHER PUBLICATIONS

Chen et al., "Deployment of Updated Services or Layers on Demand Through Containers", U.S. Appl. No. 18/062,266, filed Dec. 6, 2022, 32 pages. (Specs + Drawings).

Patel, Pratiksha, "Minimizing Docker Image Size", CloudYuga. guru, May 22, 2023, <https://cloudyuga.guru/hands_on_lab/minimize-docker-image#2>, 18 pages.

International Searching Authority, "Notification of Transmittal of the International Search Report and the Written Opinion of the International Searching Authority, or Declaration," Patent Cooperation Treaty, Jan. 14, 2025, 14 pages, International Application No.-PCT/EP2024/082156.

* cited by examiner

ON-DEMAND IMAGE LAYER RETRIEVAL

BACKGROUND

The present invention relates generally to data storage, and more particularly to container images.

Typically, containerization functions in either an operating system-level virtualization or application-level virtualization over multiple network resources so that software applications can run in isolated containers in either a cloud or non-cloud environment. Containers typically simulate a different software application and run isolated processes using related configuration files, libraries, and dependencies.

A container image is generally understood to be an unchangeable, static file that includes executable code so it can run an isolated process on information technology (IT) infrastructure. The image, arguably the foundation of container technology, can be understood as a special file system. Images can be utilized to provide not various files, including but not limited to, programs, libraries, resources, and configuration files, which are executed by the container. Images can also include configuration parameters (e.g., anonymous volumes, environment variables, users, etc.), which the containers access during runtime.

SUMMARY

According to an aspect of the present invention, there is provided a computer-implemented method, a computer program product, and a computer system. The computer-implemented method includes assigning an identifier that specifies a number of resources and a category associated with a respective image layer of a plurality of image layers. The computer-implemented method further includes, in response to receiving a user request, identifying image layers of the plurality of image layers that match the identifier based on dependencies between the plurality of image layers. The computer-implemented method further includes, retrieving matched layers based on the functionality of respective image layers and the dependencies of those respective image layers.

BRIEF DESCRIPTION OF THE DRAWINGS

Preferred embodiments of the present invention will now be described, by way of example only, with reference to the following drawings, in which.

DETAILED DESCRIPTION

Figure 1:
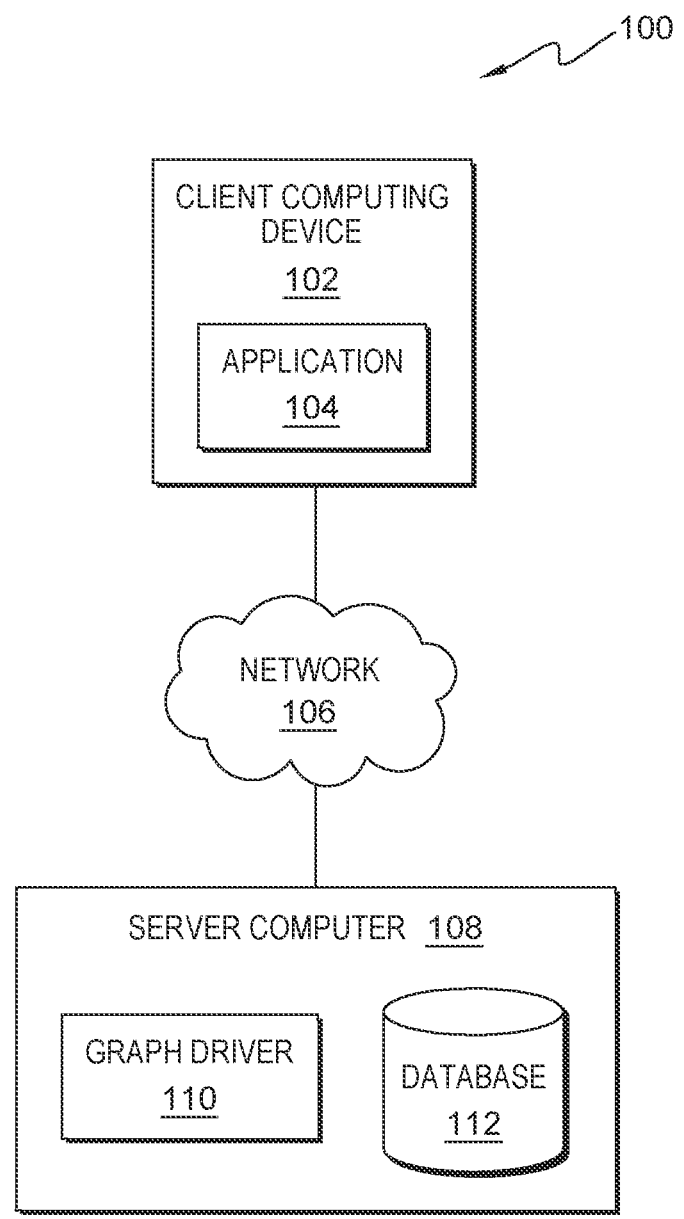
FIG. 1 depicts a block diagram of a computing environment, in accordance with an embodiment of the present invention.

According to an aspect of the invention, there is provided a computer implemented method. The computer-implemented method includes assigning an identifier that specifies a number of resources and a category associated with a respective image layer of a plurality of image layers. The computer-implemented method further includes, in response to receiving a user request, identifying image layers of the plurality of image layers that match the identifier based on dependencies between the plurality of image layers. The computer-implemented method further includes, retrieving matched layers based on functionality of respective image layers and the dependencies of those respective image layers. In this manner, embodiments of the present invention provide a technical approach that improves collection of image layers, on-demand based on the functionalities of layers even though the layers do not have direct file dependencies or layer dependencies. Performing one or more aspects of the invention ensures integrity of an application when downloading an image layer as an aggregated collection on demand and reduces impact to a user environment.

In embodiments, the computer-implemented that includes assigning an identifier that specifies a number of resources and a category associated with a respective image layer of a plurality of image layers, in response to receiving a user request, identifying image layers of the plurality of image layers that match the identifier based on dependencies between the plurality of image layers, retrieving matched layers based on functionality of respective image layers and the dependencies of those respective image layers, can further include generating a list that represents a number of resources associated with the respective image layers comprising respective identifiers. Generating a list that represents a number of resources associated with the respective image layers that include respective identifiers to record the number of resources that is associated with an image layer allows aspects of the invention to identify image layers that satisfy a user's requirements.

In embodiments, the computer-implemented includes assigning an identifier that specifies a number of resources and a category associated with a respective image layer of a plurality of image layers, in response to receiving a user request, identifying image layers of the plurality of image layers that match the identifier based on dependencies between the plurality of image layers, retrieving matched layers based on functionality of respective image layers and the dependencies of those respective image layers, generating a list that represents a number of resources associated with the respective image layers comprising respective identifiers can further include detecting how many resources are associated with respective image layers of the plurality of image layers using the generated list. Detecting how many resources are associated with respective image layers of the plurality of image layers using the generated list allow aspects of the invention to build a minimum dependency graph to pull the matched layers.

The computer-implemented method includes assigning an identifier that specifies a number of resources and a category associated with a respective image layer of a plurality of image layers, in response to receiving a user request, identifying image layers of the plurality of image layers that match the identifier based on dependencies between the plurality of image layers, where identifying image layers of the plurality of image layers that match the identifier based on dependencies between the plurality of image layers comprises generating a dependency graph using submissive and dependent sequences. Generating a dependency graph using submissive and dependent sequences allows aspects of the invention to determine a collection of image layers based on user requirements. The computer-implemented method further includes, retrieving matched layers based on functionality of respective image layers and the dependencies of those respective image layers.

The computer-implemented method includes assigning an identifier that specifies a number of resources and a category associated with a respective image layer of a plurality of image layers, in response to receiving a user request, identifying image layers of the plurality of image layers that match the identifier based on dependencies between the plurality of image layers, where identifying image layers of the plurality of image layers that match the identifier based on dependencies between the plurality of image layers comprises generating a dependency graph using submissive and dependent sequences, where generating a dependency graph using submissive and dependent sequences includes creating a dependency between a layer of the plurality of image layers and at least one layer committed after the layer; and creating a dependency between the layer of the plurality of image layers and the at least one layer committed after the layer based on functionality of the at least one layer modifying the layer. Creating a dependency between a layer of the plurality of image layers and at least one layer committed after the layer; and creating a dependency between the layer of the plurality of image layers and the at least one layer committed after the layer based on functionality of the at least one layer modifying the layer have the benefit of generating a minimum dependency graph that allows users to pull the image layers on-demand in a convenient manner. The computer-implemented method further includes, retrieving matched layers based on functionality of respective image layers and the dependencies of those respective image layers.

The computer-implemented method includes assigning an identifier that specifies a number of resources and a category associated with a respective image layer of a plurality of image layers, in response to receiving a user request, identifying image layers of the plurality of image layers that match the identifier based on dependencies between the plurality of image layers, where identifying image layers of the plurality of image layers that match the identifier based on dependencies between the plurality of image layers comprises generating a dependency graph using submissive and dependent sequences, where generating a dependency graph using submissive and dependent sequences includes creating a dependency between a layer of the plurality of image layers and at least one layer committed after the layer; and creating a dependency between the layer of the plurality of image layers and the at least one layer committed after the layer based on functionality of the at least one layer modifying the layer. The computer-implemented method further includes parsing the generated list and selecting image layers represented in the dependency graph that match the user request as results that satisfy the user request. Parsing the generated list and selecting image layers represented in the dependency graph that match the user request as results that satisfy the user requirements allows embodiments of the present invention to determine a collection of image layers based on user requirements and provides only the requested layers as a collection without needing to retrieve every layer. Therefore, aspects disclosed herein increase the speed of image layer retrieval by reducing the image layers downloaded therein. The computer-implemented method further includes, retrieving matched layers based on functionality of respective image layers and the dependencies of those respective image layers.

The computer-implemented method includes assigning an identifier that specifies a number of resources and a category associated with a respective image layer of a plurality of image layers. The computer-implemented method further includes, in response to receiving a user request, identifying image layers of the plurality of image layers that match the identifier based on dependencies between the plurality of image layers, where identifying image layers of the plurality of image layers that match the identifier based on dependencies between the plurality of image layers comprises generating a dependency graph using submissive and dependent sequences, where generating a dependency graph using submissive and dependent sequences includes creating a dependency between a layer of the plurality of image layers and at least one layer committed after the layer; and creating a dependency between the layer of the plurality of image layers and the at least one layer committed after the layer based on functionality of the at least one layer modifying the layer. The computer-implemented method further includes parsing the generated list and selecting image layers represented in the dependency graph that match the user request as results that satisfy the user request. The computer-implemented method includes building a minimum dependency graph by analyzing parent and dependent nodes of each selected image layer. Building a minimum dependency graph by analyzing parent and dependent nodes of each selected image layer allows aspects of the invention to select image layers that match the user request even though those layers do not have direct file dependencies or layer dependencies. The computer-implemented method further includes, retrieving matched layers based on functionality of respective image layers and the dependencies of those respective image layers.

The computer-implemented method includes assigning an identifier that specifies a number of resources and a category associated with a respective image layer of a plurality of image layers, where an identifier is a form of character strings that represents a number of resources associated with a respective image layer and resource category. The identifier functions as a mechanism to identify which image layers to select as a collection rather individual retrieval which could be time consuming or bulk download which could provide additional layers and add additional layers not requested by the users. As such, the identifier allows aspects of the invention provides only the requested layers as a collection without needing to retrieve every layer which increase the speed of image layer retrieval by reducing the image layers downloaded therein. The computer-implemented method further includes, in response to receiving a user request, identifying image layers of the plurality of image layers that match the identifier based on dependencies between the plurality of image layers. The computer-implemented method further includes, retrieving matched layers based on functionality of respective image layers and the dependencies of those respective image layers. In this manner, embodiments of the present invention provide a technical approach that improves collection of image layers, on-demand, based on the functionalities of layers even though the layers do not have direct file dependencies or layer dependencies.

According to an aspect of the invention, there is provided a computer program product. The computer program product comprises one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; and program instructions to download matched layers based on functionality of respective image layers and the dependencies of those respective image layers. In this manner, embodiments of the present invention provide a technical approach that improves collection of image layers, on-demand based on the functionalities of layers even though the layers do not have direct file dependencies or layer dependencies. Performing one or more aspects of the invention ensures integrity of an application when downloading an image layer as an aggregated collection on demand and reduces impact to a user environment.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; and program instructions to download matched layers based on functionality of respective image layers and the dependencies of those respective image layers can further include program instructions to generate a list that represent a number of resources associated with the respective image layers comprising respective identifiers. Generating a list that represents a number of resources associated with the respective image layers that include respective identifiers to record the number of resources that is associated with an image layer allows aspects of the invention to identify image layers that satisfy a user's requirements.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; program instructions to download matched layers based on functionality of respective image layers and the dependencies of those respective image layers; and program instructions to generate a list that represent a number of resources associated with the respective image layers comprising respective identifiers can further include program instructions to detect how many resources are associated with respective image layers of the plurality of image layers using the generated list. Detecting how many resources are associated with respective image layers of the plurality of image layers using the generated list allow aspects of the invention to build a minimum dependency graph to pull the matched layers.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; and program instructions to download matched layers based on functionality of respective image layers and the dependencies of those respective image layers. In this manner, embodiments of the present invention provide a technical approach that improves collection of image layers, on-demand based on the functionalities of layers even though the layers do not have direct file dependencies or layer dependencies. Performing one or more aspects of the invention ensures integrity of an application when downloading an image layer as an aggregated collection on demand and reduces impact to a user environment.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences. Generating a dependency graph using submissive and dependent sequences allows aspects of the invention to determine a collection of image layers based on user requirements. The computer program product can further include program instructions to download matched layers based on functionality of respective image layers and the dependencies of those respective image layers.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences, the program instructions to generate a dependency graph using submissive and dependent sequences comprise program instructions to create a dependency between a layer of the plurality of image layers and at least one layer committed after the layer; and program instructions to create a dependency between the layer of the plurality of image layers and the at least one layer committed after the layer based on functionality of the at least one layer modifying the layer. Creating a dependency between a layer of the plurality of image layers and at least one layer committed after the layer; and creating a dependency between the layer of the plurality of image layers and the at least one layer committed after the layer based on functionality of the at least one layer modifying the layer have the benefit of generating a minimum dependency graph that allows users to pull the image layers on-demand in a convenient manner. The computer program product can further include program instructions to download matched layers based on functionality of respective image layers and the dependencies of those respective image layers.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences, the program instructions to generate a dependency graph using submissive and dependent sequences comprise program instructions to create a dependency between a layer of the plurality of image layers and at least one layer committed after the layer; and program instructions to create a dependency between the layer of the plurality of image layers and the at least one layer committed after the layer based on functionality of the at least one layer modifying the layer. The computer program product can further include program instructions to download matched layers based on functionality of respective image layers and the dependencies of those respective image layers. The computer product can further include program instructions to parse the generated list and selecting image layers represented in the dependency graph that match the user request as results that satisfy the user request. Parsing the generated list and selecting image layers represented in the dependency graph that match the user request as results that satisfy the user requirements allows embodiments of the present invention to determine a collection of image layers based on user requirements and provides only the requested layers as a collection without needing to retrieve every layer. Therefore, aspects disclosed herein increase the speed of image layer retrieval by reducing the image layers downloaded therein.

The computer program product that includes one or more computer readable storage media and program instructions stored on the one or more computer readable storage media, the program instructions including program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences, the program instructions to generate a dependency graph using submissive and dependent sequences comprise program instructions to create a dependency between a layer of the plurality of image layers and at least one layer committed after the layer; and program instructions to create a dependency between the layer of the plurality of image layers and the at least one layer committed after the layer based on functionality of the at least one layer modifying the layer. The computer program product can further include program instructions to download matched layers based on functionality of respective image layers and the dependencies of those respective image layers. The computer product can further include program instructions to parse the generated list and selecting image layers represented in the dependency graph that match the user request as results that satisfy the user request. The computer program product can further include program instructions to build a minimum dependency graph by analyzing parent and dependent nodes of each selected image layer. Building a minimum dependency graph by analyzing parent and dependent nodes of each selected image layer allows aspects of the invention to select image layers that match the user request even though those layers do not have direct file dependencies or layer dependencies. The computer-implemented method further includes, retrieving matched layers based on functionality of respective image layers and the dependencies of those respective image layers.

The computer program product that includes one or more computer readable storage media and program instructions stored on the one or more computer readable storage media, the program instructions including program instructions to assign an identifier that specifies a number of resources and a category associated with a respective image layer of a plurality of image layers, where an identifier is a form of character strings that represents a number of resources associated with a respective image layer and resource category. The identifier functions as a mechanism to identify which image layers to select as a collection rather individual retrieval which could be time consuming or bulk download which could provide additional layers and add additional layers not requested by the users. As such, the identifier allows aspects of the invention provides only the requested layers as a collection without needing to retrieve every layer which increase the speed of image layer retrieval by reducing the image layers downloaded therein. The program instructions can further include program instructions to, in response to receiving a user request, identify image layers of the plurality of image layers that match the identifier based on dependencies between the plurality of image layers; and program instructions to download matched layers based on functionality of respective image layers and the dependencies of those respective image layers.

According to an aspect of the invention, there is provided a computer system. The computer system comprising one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; and program instructions to download matched layers based on functionality of respective image layers and the dependencies of those respective image layers. In this manner, embodiments of the present invention provide a technical approach that improves collection of image layers, on-demand based on the functionalities of layers even though the layers do not have direct file dependencies or layer dependencies. Performing one or more aspects of the invention ensures integrity of an application when downloading an image layer as an aggregated collection on demand and reduces impact to a user environment.

The computer system of claim that includes one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; and program instructions to download matched layers based on functionality of respective image layers and the dependencies of those respective image layers can further include program instructions to generate a list that represent a number of resources associated with the respective image layers comprising respective identifiers. Generating a list that represents a number of resources associated with the respective image layers that include respective identifiers to record the number of resources that is associated with an image layer allows aspects of the invention to identify image layers that satisfy a user's requirements.

The computer system that includes one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers; program instructions to download matched layers based on functionality of respective image layers and the dependencies of those respective image layers; and program instructions to generate a list that represent a number of resources associated with the respective image layers comprising respective identifiers can further include program instructions to generate a list that represent a number of resources associated with the respective image layers comprising respective identifiers. Detecting how many resources are associated with respective image layers of the plurality of image layers using the generated list allow aspects of the invention to build a minimum dependency graph to pull the matched layers.

The computer system that includes one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences. Generating a dependency graph using submissive and dependent sequences allows aspects of the invention to determine a collection of image layers based on user requirements. The computer system can also include program instructions to download matched layers based on functionality of respective image layers and the dependencies of those respective image layers.

The computer system that includes one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences, wherein the program instructions to generate a dependency graph using submissive and dependent sequences comprises program instructions to create a dependency between a layer of the plurality of image layers and at least one layer committed after the layer; and program instructions to create a dependency between the layer of the plurality of image layers and the at least one layer committed after the layer based on functionality of the at least one layer modifying the layer. Creating a dependency between a layer of the plurality of image layers and at least one layer committed after the layer; and creating a dependency between the layer of the plurality of image layers and the at least one layer committed after the layer based on functionality of the at least one layer modifying the layer have the benefit of generating a minimum dependency graph that allows users to pull the image layers on-demand in a convenient manner. The computer system can also include program instructions to download matched layers based on functionality of respective image layers and the dependencies of those respective image layers.

The computer system that includes one or more computer processors, one or more computer readable storage media, and program instructions stored on the one or more computer readable storage media for execution by at least one of the one or more computer processors, the program instructions comprising program instructions to assign an identifier that specifies a number of resources and a category associated with a respective image layer of a plurality of image layers; program instructions to, in response to receiving a user request, identify image layers of the plurality of image layers that match the identifier based on dependencies between the plurality of image layers, wherein the program instructions to identify image layers of the plurality of image layers that match the identifier based on dependencies between the plurality of image layers comprise program instructions to generate a dependency graph using submissive and dependent sequences, wherein the program instructions to generate a dependency graph using submissive and dependent sequences comprises program instructions to create a dependency between a layer of the plurality of image layers and at least one layer committed after the layer; and program instructions to create a dependency between the layer of the plurality of image layers and the at least one layer committed after the layer based on functionality of the at least one layer modifying the layer. The computer system can also include program instructions to download matched layers based on functionality of respective image layers and the dependencies of those respective image layers. In some embodiments, the computer system can also include program instructions to parse the generated list and selecting image layers represented in the dependency graph that match the user request as results that satisfy the user request. Parsing the generated list and selecting image layers represented in the dependency graph that match the user request as results that satisfy the user requirements allows embodiments of the present invention to determine a collection of image layers based on user requirements and provides only the requested layers as a collection without needing to retrieve every layer. Therefore, aspects disclosed herein increase the speed of image layer retrieval by reducing the image layers downloaded therein.

Embodiments of the present invention recognize that users at the enterprise level require minimal impact to their systems when receiving update packages to minimize down time to the production environment to avoid unexpected problems. Images are distributed to provide upgraded programmatic elements. As such, when an image is committed, in existing systems, all the contents of the image layers can be pushed to a repository in the form of an image. When pulling an image from the repository, a consumer of the image (e.g., a resource in a computing system) will retrieve all the contents of the specified image layers and all parent layers to a local resource. Layers can include, but are not limited to, pervasive features, High Impact/Pervasive program temporary fixes (HIPER) features, recommended features, new features, and a base image. Because all layers are uploaded and/or downloaded together, even when only certain layers are being refreshed, the download will include all layers. The necessity in existing systems of downloading and/or uploading all layers increases system overhead including container deployment time. Additionally, when only a specific package (and not all updated packages) is desired to address a particular situation (e.g., a banking customer requires an update HIPER features to address potential outages or security issues), updating an entirety of a resource introduces risk.

This problem often occurs in large scale and frequently updated projects. Building specific images for all customers and situations is not a scalable solution. Thus, a need exists to deploy specific (targeted) applications on-demand via container images. In some cases, the user may want to get a collection that contains layers related to an application middleware, hardware support, etc. For example, a user may specify a request for all of database 2 (DB2®) features from a repository containing an image comprising 6 layers. Embodiments of the present invention can locate all DB2® features, find dependency layers of DB features, and retrieve the matched layers for the user and exclude the other layers as discussed in greater detail with respect to FIG. 2.

Embodiments of the present invention provide solutions for automatically pulling image layers on-demand by detecting aggregated collection IDs and minimum dependency of image layers making the image deployment automated and intelligent while maintaining as little impact to the user environment as discussed in greater detail, later in this Specification. Unlike existing approaches, the examples herein enable a customized and targeted deployment to fulfill specific technical needs, rather than a blanket deployment of all image layers, as the latter increases both system overhead and risk. In some of the examples herein, program code executing on one or more processors deploys updated services or layers on demand through containers. In embodiments of the present invention, the program code extracts or assigns aggregated collection IDs (AC ID) that is used for indicating the character strings assigned to an image layer during image committing and deployment, detects every image layer assigned with AC IDS, specify AC ID parameter for downloading image layers, and determines dependencies between image layers when generating and deploying containers such that a user can receive a more targeted container with current and/or interdependent layers, rather than a deployment that includes unnecessary overhead. To this end, as explained in greater detail herein, the program code analyzes layers for dependencies and groups interdependent changes within the layers based on both these dependencies and on when the changes were implemented (as compared to the last image refresh of the target machine). For example, the program code can generate an ILDG (incremental layer directed graph) and utilize the ILDG to identify sequences of image layers (referred to herein as submissive sequences and dependent sequences) of the image layers. The program code also monitors the timing of uploading (e.g., timestamps) and which files modify other files. Based on understanding these aggregated collection IDs, dependencies and the timing of the changes to the elements in addition to which elements modify common elements, the program code can deploy updated services or layers on demand through containers without including excess content in the deployments.

As will be explained herein, program code in various embodiments of the present invention extracts or assigns aggregated collection IDs (AC ID) that is used for indicating the character strings assigned to an image layer during image committing and deployment, detects every image layer assigned with AC IDS, specify AC ID parameter for downloading image layers. Embodiments of the present invention can then build a multiple hierarchy directed graph of the image layers referred to herein as an ILDG. This directed graph includes the timestamps of the uploading and the modification of the files. Uploading refers to when new copies of various files were uploaded, and modification refers to which files a given file modifies. For example, certain layers can modify the same file. The ILDG includes (represents) at least two types of relationships among the images: submissive sequences and dependent sequences. A submissive sequence is a sequence that is based on a timestamp of uploading of the layer(s) and/or applications. A dependent sequence is a sequence and is based on dependency of layers based on modifications of the files (there is a dependency when layers modify the same file). The program code can generate a dependent sequence by searching a node's parent dependent nodes with the modification of the files. The program code can generate a submissive sequence by searching a node's parent submissive nodes with the timestamp of uploading of the files.

The program code generates an ILDG with both the submissive sequence and the dependent sequence. In generating the ILDG, the program code can map submissive nodes to dependent nodes to represent relationships (e.g., dependencies). In tracking these relationships between image layers, the program code can utilize various attributes, including but not limited to either an aggregated collection ID (AC ID), a layer identifier (Layer ID), or a relationship identifier (Relation ID) and a respective relationship identifier list (Relation ID List) or a respective Aggregated Collection ID List.

As mentioned earlier an AC ID is used for indicating the character strings assigned to an image layer during image committing and deployment and represents that the image layer associated with a resource (e.g., application, middleware, hardware, etc.). A Layer ID represents a unique image identifier for a respective image layer. The relationship identifier of the given image layer comprises a hash of unique image identifiers for the one or more layers that were committed after the given image layer was committed.

A Relation ID, which the program code can calculate for a given node by applying a hash algorithm to its ancestor submissive nodes' image identifiers, uniquely matches an image to a layer. The Relation ID List records all the parent the dependent nodes' Relation IDs for a given node. The new attribute Aggregated Collection ID list is introduced for detected how many resources are associated with an image layer. An image layer can have multiple AC IDs. The program code builds a dependent sequence through the Relation ID list. Embodiments of the present invention can then determine dependencies between image layers when generating and deploying containers.

Embodiments of the present invention are inextricably tied to computing and are directed to a practical application. Embodiments of the present invention are rooted in computer technology and address a specific challenge in computer technology by providing a technical solution. The issue that is addressed by the examples herein is that when a container is deployed, more layers than required by the resource are deployed causing additional overhead and exposing the resource to risks. The examples herein provide a system and method for generating and deploying a container on demand that based on understanding the dependencies of the layers and when the changes to the various layers were implemented, the program code can deploy a flexible container, on-demand. Specifically, program code can pull image layers on demand as a collection by detecting aggregated collection IDs and a minimum dependency of image layers making the image deployment automated and intelligent that maintains a minimal impact to the user environment as possible. For example, the program code can generate a targeted container for deployment that does not include extra applications or features. Not only are the examples inextricably tied to computing, but the examples herein are integrated into a practical application.

Embodiments of the present invention provide significantly more than existing container deployment techniques. The examples herein enable a resource to download image layers on-demand, as a collection, and in a manner that affects, for example, a production environment of and enterprise level customer (in which this resource resides) as little as possible, when updating and exploiting the new features or fixes. The examples herein increase the speed of deployments by reducing the image layers downloaded therein. In testing and development phases of projects, utilizing the examples herein enable testing groups to switch to container working environments. The examples herein are transparent to end users and are compatible with current container tools. Certain existing approaches focus on reducing the size of an image to preserve disk space, but the examples herein not only reduce the size but also, reduce the contents of the container in a manner that simplifies downloading, installing, and updating processes during deployment of the container. Other approaches attempt to merge image layers, but in the examples herein, the relationships between layers are understood such that layers can be excluded from a deployment. The examples herein reduce the number of layers and the amount of data of image files by determining a minimum dependency of image layers to include in a container.

Certain aspects of the present invention provide an intelligent and convenient method to determine a collection of image layers based on user requirements. Embodiments of the present invention allows users to retrieve image layers by indicating a resource category (e.g., name of application, middleware, hardware, etc.) for more flexible and efficient application deployment. Embodiments of the present invention helps users to pull image layers on-demand based on the functionalities of layers even though those layers do not have direct file dependencies or layer dependencies.

Embodiments of the present invention provide an aggregated collection ID option that provides a user an ability to add a tag to a respective image layer when committing the layer. In response to receiving a user request (e.g., user parameters that specify functionality of layers), embodiments of the present invention can utilize or otherwise specify AC IDs and retrieve all matched layers. Embodiments of the present invention ensures integrity of the application as much as possible when downloading the image layer as an aggregated collection on demand and reduced the impact on the user environment. Certain embodiments of the present invention provide certain advantages for traditional development and testing group to switch to a container working environment and can be compatible with current container tools.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing a process (or multiple processes) that, e.g., facilitates granular real-time data attainment and delivery including as relevant to soliciting, generating, and timely transmitting, granular product review to consumers. Aspects of the present invention are not limited to a particular architecture or environment.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access graph driver 110 (e.g., using TCP/IP) to access user information and database information. Application 104 can further communicate with graph driver 110 determine a collection of image layers based on the user's requirements, as discussed in greater detail in FIGS. 2-8.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts graph driver 110 and database 112. In this embodiment, graph driver 110 resides on server computer 108. In other embodiments, graph driver 110 can have an instance of the program (not shown) stored locally on client computing device 102. In other embodiments, graph driver 110 can be a standalone program or system that can be integrated in one or more computing devices having a display screen.

Graph driver 110 (as referred to as program code) determines a collection of image layers based on users' requirements and allows users to download image layers by indicate resource category (e.g., name of application, middleware, hardware, etc.) for more flexible and efficient application deployment. Graph driver 110 includes an Incremental Aggregated Collection ID Builder (IACIB) Module and an Incremental Aggregated Collection ID Parser (IACIP) Module (both shown and discussed in greater detail in FIG. 2).

In this embodiment, graph driver 110 assigns an identifier (i.e., an aggregated collection ID also referred to as AC ID) that specifies a number of resources and a category associated with a respective image layer of a plurality of image layers. In response to receiving a user request, graph driver 110 can identify image layers of the plurality of image layers that match the identifier based on dependencies between the plurality of image layers. A user request can include specified parameters for downloading image layers (e.g., an AC ID, a Layer ID, or a Relation ID). Graph driver 110 can then retrieve matched layers based on the functionality of respective image layers and the dependencies of those respective image layers. In this way, graph driver 110 can dynamically pull image layers on-demand as a collection by detecting aggregated collection IDs and a minimum dependency of image layers as described in greater detail below.

In this embodiment, graph driver 110 utilizes an aggregated collection ID (AC ID) as a mechanism to identify which image layers to select as a collection. As mentioned prior, the aggregated collection ID represents a form of character strings that can be assigned to an image layer during the image committing and deployment process. Graph driver 110 can build a new attributed aggregated collect ID list from stored AC IDs to record the number of resources that is associated with an image layer. The IACIB module in graph driver 110 automatically assigns aggregated collection IDs to a respective image layer when committing an image to a repository based on its category and resources used and eventually generates the aggregated collection ID list which can later be used to detect how many resources are associated with an image layer. In this embodiment an image layer can have multiple AC IDs. The IACIP module in graph driver 110 can then be leveraged by graph driver 110 when downloading an image from the repository. In this embodiment, the IACIP module parses the aggregated collection ID list to identify all image layers that satisfy users' need. The IACIP module can then analyze the relation ID list of each identified layer to build a minimum dependency graph and pull the matched layers.

Database 112 stores received information and can be representative of one or more databases that give permissioned access to graph driver 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
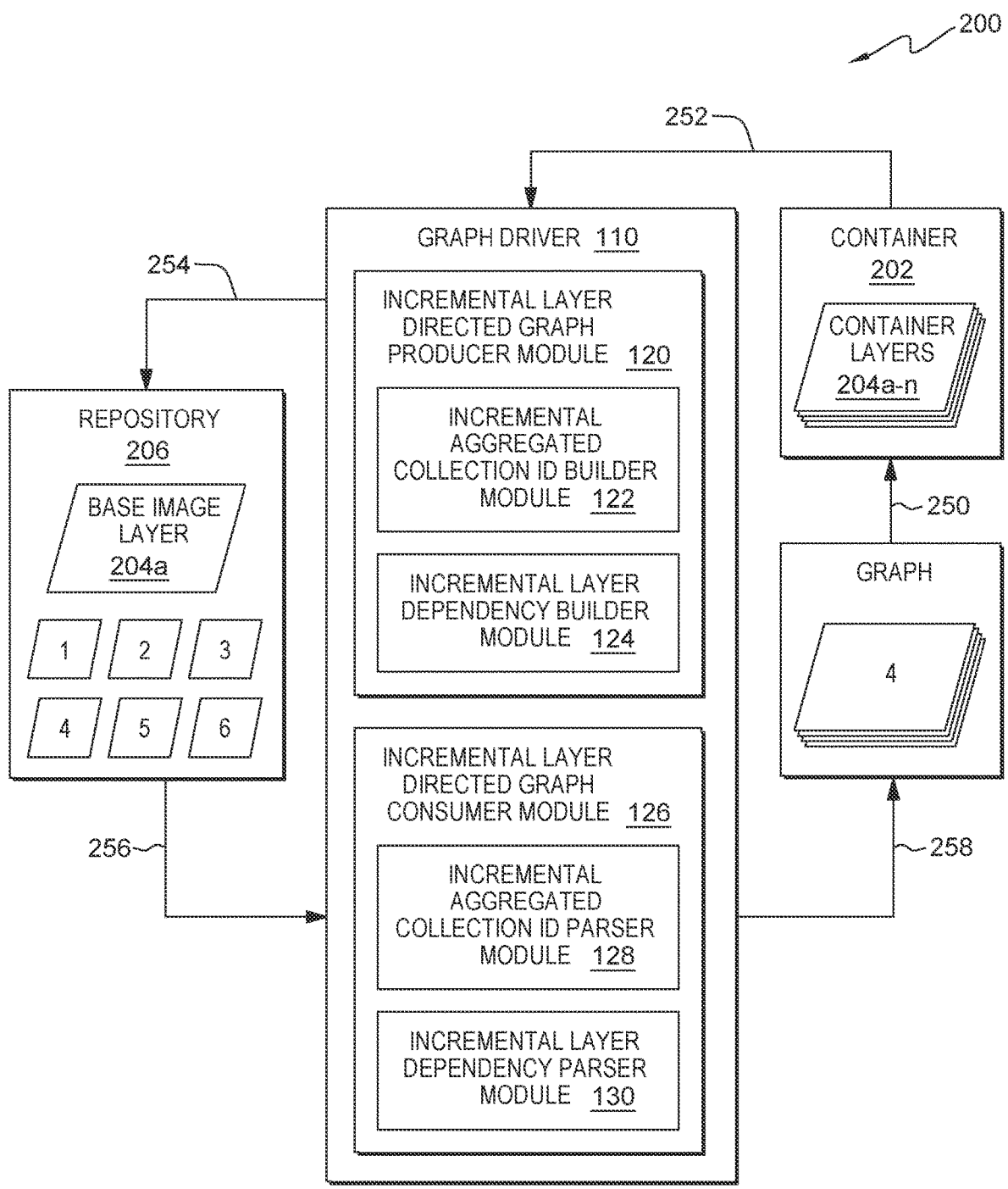
FIG. 2 is an example diagram of interactions of a graph driver, in accordance with an embodiment of the present invention.

FIG. 2 is an example diagram 200 of interactions of a graph driver, in accordance with an embodiment of the present invention.

Example diagram 200 depicts interactions of a graph driver (e.g., graph driver 110) committing a new image layer represented by line 250. In this embodiment, graph driver 110 includes incremental layer directed graph producer (ILDGP) module 120 and incremental layer directed graph consumer (ILDGC) module 126. Incremental layer directed graph producer module 120 includes incremental aggregated collection ID builder (IACIB) module 122 and incremental layer dependency builder (ILDB) module 124. Incremental layer directed graph consumer (ILDGC) module 126 includes incremental aggregated collection ID parser (IACIP) module 128 and incremental layer dependency parser (ILDP) module 130.

In this example, graph driver 110 can utilize IACIB module 122 to either extract or assign aggregated collection IDs (AC IDs) to container layers 204*a-n* as denoted by line 252. Graph driver 110 can then store the container layers (e.g., container layers 204*a-n*) and their respective AC IDs to repository 206 as denoted by line 254. Repository 206 stores base image layer 204*a* along with its respective image layers. In this example, each layer represents a different function. For example, Layer 6 represents XYZ monitoring features, Layer 5 represents XYZ monitoring for IMS features, Layer 4 represents XYZ monitoring for DB2® features, Layer 3 represents XYZ monitoring for storage, Layer 2 represents IMS system services, Layer 1 represents DB2® base features, and Layer 0 is represented as base image layer 204a.

Continuing this example, a user may specify a request for all of database 2 (DB2®) features. Embodiments of the present invention (i.e., program code referenced as graph driver 110 utilizing IACIB module 122 to identify the correct container layer (e.g., base image layer 204a), can then access repository 206 to identify a container layer (e.g., base image layer 204a) that matches the user request.

Graph driver 110 can then locate all DB2® features utilizing IACIB module 122 and ILDB module 124 (e.g., Layer 1 DB2® base features and Layer 4, (XYZ for DB2® features) and find dependency layers of DB features (e.g., Layer 3 (XYZ monitoring for storage) is a dependency layer of Layer 4 (XYZ for DB2® features) and Layer 0 (base image layer 204a) is the dependency layer of Layer 1 (DB2® base features) and Layer 3 (XYZ for storage)).

Graph driver 110 can then retrieve all the matched layers for the user (e.g., Layer 0, Layer 1, Layer 3, and Layer 4) and exclude Layers 2, 5, and 6 represented by 256 and subsequently present the matched layers for the user as denoted by line 258 (e.g., showing a directed graph contain layer 4 and its respective dependencies (e.g., Layer 0, 1, 3, and 4)).

Figure 3:
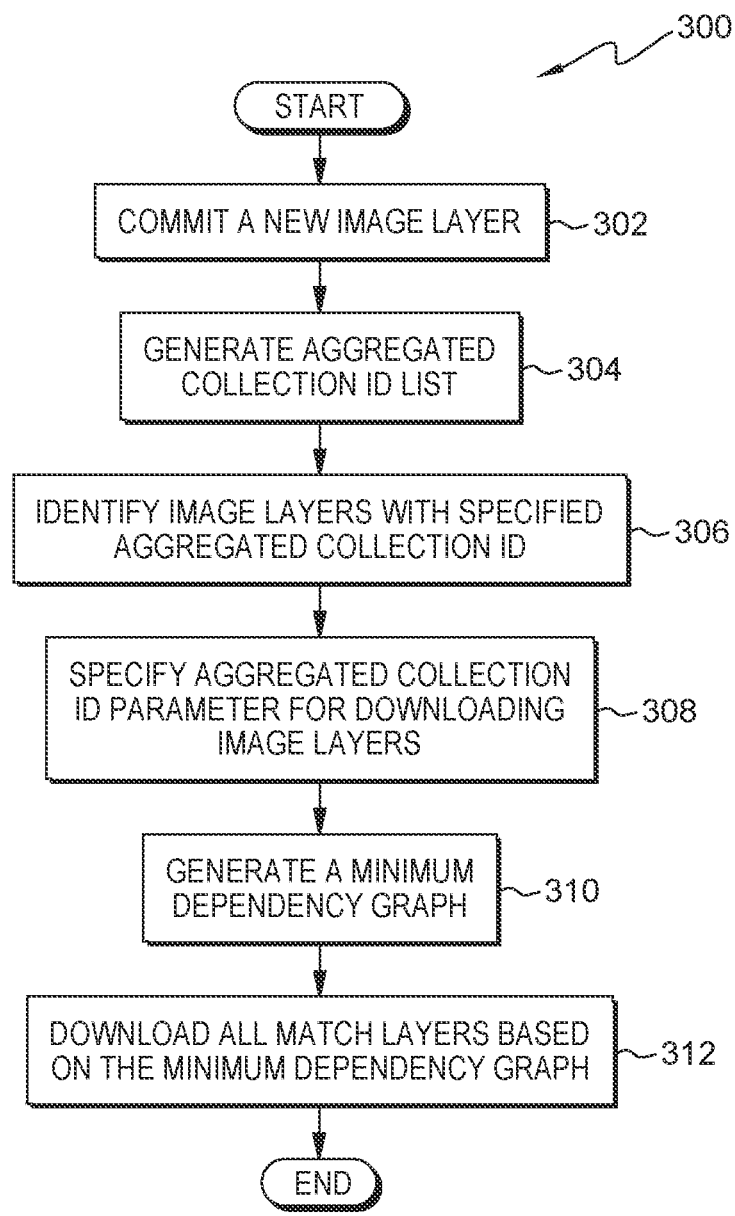
FIG. 3 is a flowchart depicting operational steps for pulling image layers on demand as a collection, in accordance with an embodiment of the present invention.

FIG. 3 is a flowchart 300 depicting operational steps for pulling image layers on demand as a collection, in accordance with an embodiment of the present invention.

In step 302, graph driver 110 commits a new image layer. In this embodiment, graph driver 110 commits a new image layer with an aggregated collection ID option specified. A typical docker image may look like Example 1 reproduced below.

```
#docker image inspect xxx
[ . . .
    "RootFS": {
    "Type": "layers",
    "Layers": [
    "sha256:
        ccdbb80308cc5ef43b605ac28fac29c6a597f89f5a1
        69bbedbb8dec 29c987439",
    "sha256:
        63c99163f47292f80f9d24c5b475751dbad6dc7955
        96e935c5c7f1c 73dc08107",
    "sha256:
        2f140462f3bcf8cf3752461e27dfd4b3531f266fa10
        cda716166bd3a 78a19103"]
    } . . .
]
```

Example 1: Typical Docker Image

In step 304, graph driver 110 generates an aggregated collection ID list. In this embodiment, graph driver 110 generates an aggregated collection ID list by either extracting or assigning AC IDs. An example of a docker image having an AC ID is reproduced below as shown by Example 2.

```
$ docker inspect xxx:yyy
[
    {
    "Id":
    "sha256:
        2f140462f3bcf8cf3752461e27dfd4b3531f266fa10cd
        a716166bd3a78a191 03",
    "RepoTags": ["xxx:yyy"],
    "Created": "20123-09-04T21:20:11.581830492Z",
    "AggregatedCollectionIDList": [ACID1 ACID2],
    "RelationID":
    "FDList": [ ],
    "LDList": [ ],
    "Relation ID List": [ ], /* Those 4 attributes were proposed in previous disclosures.
    */
    . . .
    } . . .
]
```

Example 2: Docker Image with Assigned ACID

As shown in Example 2, this docker image describes a layer that is assigned with two tags, ACID1 and ACID2. Example 2 also shows Relation IDs, an FD list, an LD List, and a Relation ID list.

Graph driver 110 can then generate an aggregated collection ID list utilizing IACIB module 122. As mentioned prior, the aggregated collection ID lists the character strings assigned to a layer during image committing and deployment. A new attribute AC ID describes the image layer from a functional perspective and functions as a tag assigned to the image layer. Each tag represents the purpose of the layer and can help users flexibly obtain requested resources. A layer can have multiple AC IDs, which means the layers relate with multi-functional intents. Graph driver 110 can generate the aggregated collection ID list and use this list as a new attribute which allow graph driver 110 to locate all image layers related with an AC ID and can be used to determine the minimum dependency of image layers as described in greater detail later with respect to FIG. 4.

In step 306, graph driver 110 identifies image layers with specified aggregated collection IDs. In this embodiment, graph driver 110 identifies image layers with specified collection IDs in response to receiving a user request. For example, a user can specify in the request to retrieve all features pertaining to database 2. Graph driver 110 can then utilize IACIP module 128 to detect every image layer assigned with AC IDs that match the user request by parsing the aggregated collection ID list.

In step 308, graph driver 110 specifies aggregated collection ID parameters for downloading image layers. In this embodiment, graph driver 110 specifies aggregated collection ID parameters for downloading image layers in response to receiving and subsequently parsing user requirements. For example, a user may specify requirements to retrieve information only pertaining to a database (e.g., database 2). A user may also specify requirements by providing either the AC ID, Relation ID, or Layer ID.

In step 310, graph driver 110 generates a minimum dependency graph. In this embodiment, graph driver 110 generates a minimum dependency graph by generating a directed graph, parsing a relation ID list, and building a minimum dependency of nodes that maps submissive nodes to dependent notes to represent relationships (e.g., dependencies).

In this embodiment, the directed graph includes the timestamps of the uploading and the modification of the files. Uploading refers to when new copies of various files were uploaded and modification refers to which files a given file modifies. For example, certain layers can modify the same file. The multiple hierarchy directive graph, referred to herein as an ILDG includes (represents) at least two types of relationships among the images: submissive sequences and dependent sequences. A submissive sequence is a sequence that is based on a timestamp of uploading of the layer(s)

and/or applications. A dependent sequence is a sequence and is based on dependency of layers based on modifications of the files (there is a dependency when layers modify the same file). The program code of graph driver 110 can generate a dependent sequence by searching a node's parent dependent nodes with the modification of the files. The program code can generate a submissive sequence by searching a node's parent submissive nodes with the timestamp of uploading of the files.

The program code generates an ILDG with both the submissive sequence and the dependent sequence. In generating the ILDG, the program code can map submissive nodes to dependent nodes to represent relationships (e.g., dependencies). In tracking these relationships between image layers, the program code can utilize various attributes, including but not limited to a relationship identifier (Relation ID) and a relationship identifier list (Relation ID List). A Relation ID, which the program code can calculate for a given node by applying a hash algorithm to its ancestor submissive nodes' image identifiers, uniquely matches an image to a layer. Meanwhile, the Relation ID List records all the parent the dependent nodes' Relation IDs for a given node. The program code builds a dependent sequence through the Relation ID list.

In this embodiment, graph driver 110 thus generates a minimum dependency graph for retrieving image layers from a functional perspective using incremental aggregated collection ID parser module 128 and incremental layer dependency parser module 130 that parses the relation ID list.

In step 312, graph driver 110 retrieves all matched layers based on the minimum dependency graph. In this embodiment, graph driver 110 retrieves matched layers by downloading and subsequently providing the matched layers that satisfy (i.e., match) user parameters based on the generated minimum dependency graph with incremental layer directed graph consumer module 126.

Figure 4:
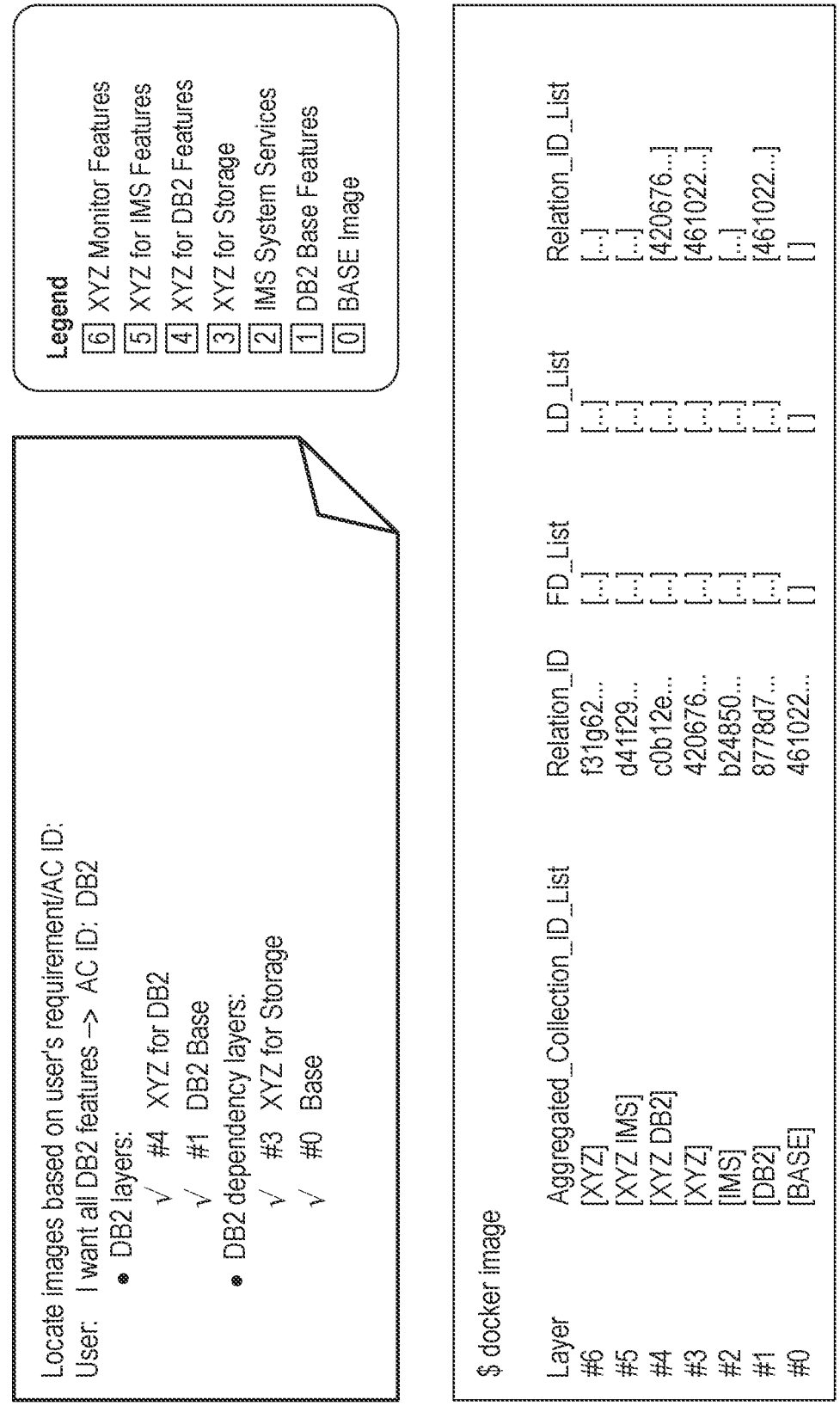
FIG. 4 is an example diagram of an aggregated collection ID list, in accordance with an embodiment of the present invention.

FIG. 4 is an example diagram 400 of an aggregated collection ID list, in accordance with an embodiment of the present invention.

This example diagram shows a mock user interface that specifies a user request. In this example the user request includes a task to located images based on the user's requirement. In this example, the user can either specify text requirements or the user may specify the aggregated collection (AC ID). For example, the user may specify the requirement to view all DB2® features or may specify the AC ID: DB 2.

Graph driver 110 may, in response to receiving this request access a repository containing a corresponding docker image that matches the user request. In this example, graph driver 110 shows a docker image that includes six layers. Each layer represents a different function. For example, Layer 6 represents XYZ monitoring features, Layer 5 represents XYZ for IMS features, Layer 4 represents XYZ monitoring for DB2® features, Layer 3 represents XYZ monitoring for storage, Layer 2 represents IMS system services, Layer 1 represents DB2® base features, and Layer 0 which represents a base image layer.

Graph driver 110 can retrieve the docker image along with the following information, each layer of the docker image, the AC collection ID List which show the images layers related with an AC ID, corresponding relation ID, corresponding FD list, and corresponding Relation ID list for each respective layer.

Figure 5:
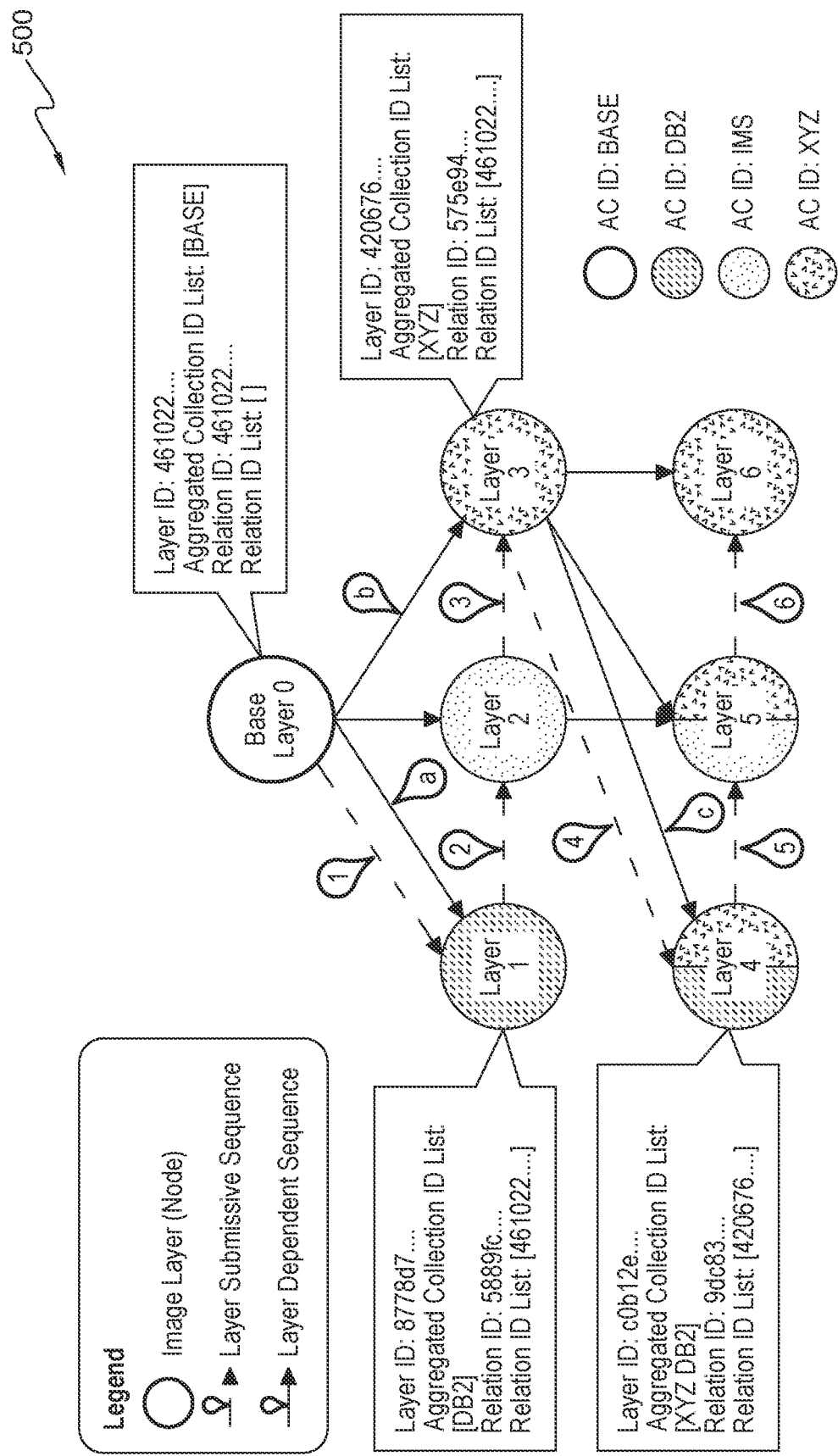
FIG. 5 is an example diagram of a user interface associated with an incremental aggregated collection ID builder, in accordance with an embodiment of the present invention.

FIG. 5 is an example diagram 500 of a user interface associated with an incremental aggregated collection ID builder, in accordance with an embodiment of the present invention.

In this example, graph driver 110 utilizes IACIB module 122 to insert the aggregated collection ID list in all image layers. In this example, graph driver 110 has assigned respective AC ID (e.g., Base, DB2®, IMS, XYZ, XYZ, DB2®, XYZ IMG, and XYZ) to Layers 0 through 6, respectively. In this instance, Layer 4 has two AC IDs XYZ and DB2® and Layer 5 also has two AC IDs IMS and XYZ.

The diagram also illustrates which layers are either a submissive sequence or a layer dependent sequence. As mentioned before, a submissive sequence is a sequence that is based on a timestamp of uploading of the layer(s) and/or applications. A dependent sequence is a sequence and is based on dependency of layers based on modifications of the files (there is a dependency when layers modify the same file).

As shown in the diagram, the submissive sequence shows the following sequence based on the timestamp of uploading the layer. Base layer 0 is the first layer in the sequence, followed by Layers 1 through 6 respectively.

The diagram also shows the following layer dependent sequence: Layers 1, 2, and 3 are dependent layers of layer 0 while Layers 4, 5 and 6 are dependent layers of layer 3. Layer 5 5 is also a dependent layer of Layer 2.

Figure 6:
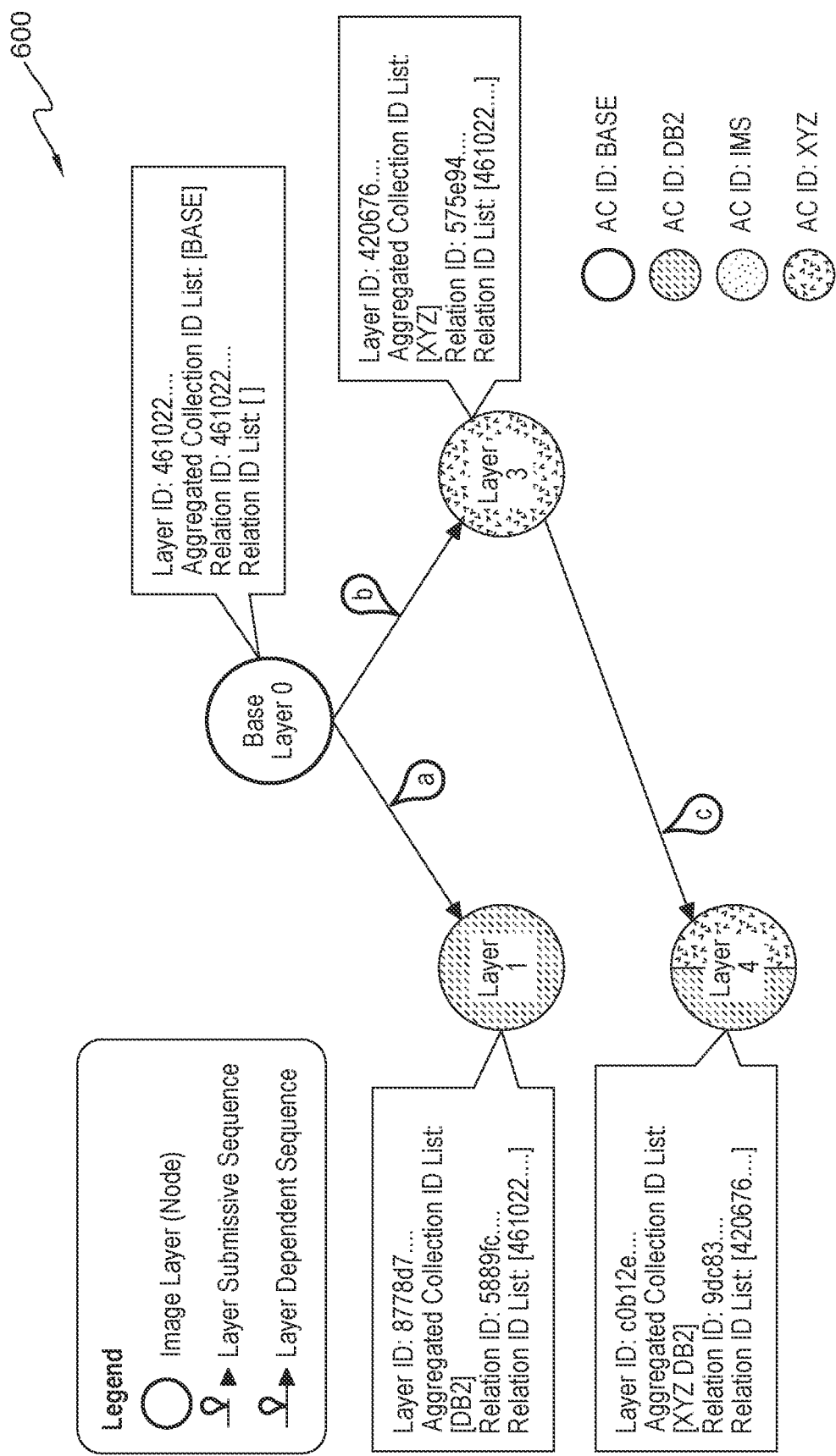
FIG. 6 is an example diagram of a user interface showing interactions of an incremental aggregated collection ID parser, in accordance with an embodiment of the present invention.

FIG. 6 is an example diagram 600 of a user interface showing interactions of an incremental aggregated collection ID parser, in accordance with an embodiment of the present invention.

This example illustrates that graph driver 110 can utilize an incremental aggregated collect ID (IACIP) module to retrieve image layers that match the user's request. In this example, a user has specified a request for all of database 2 (DB2®) features.

For example, graph driver 110 has located all DB2® features utilizing IACIP module 128 to parse the AC ID list and identify that Layer 1 contains DB2® base features and Layer 4 includes (XYZ DB2® features). Graph driver 110 can then utilize incremental layer dependency parser module 130 to find dependency layers of DB features. In this example, graph driver 110 has identified that Layer 3 (XYZ for storage) is a dependency Layer of layer 4 (XYZ for DB2® features) and Layer 0 (base image layer 204a) is the dependency layer of Layer 1 (DB2® base features) and Layer 3 (system monitoring for storage).

Graph driver 110 can then generate a minimum dependency graph based on the aggregated collection list and other metadata of the layer when pulling the image from the repository. In this example, Layer 3 is required since it has a direct dependency with Layer 4 (i.e., Layer ID 420676 . . . in Layer 3 is in the Relation ID List [420676 . . . ] of Layer 4.

Graph driver 110 can then download all the matched layers for the user (e.g., Layer 0, Layer 1, Layer 3, and Layer 4) and exclude Layers 2, 5, and 6 and subsequently present the matched layers for the user (e.g., showing a directed graph contain Layer 4 and its respective dependencies (e.g., Layers 0, 1, 3, and 4).

Figure 7A:
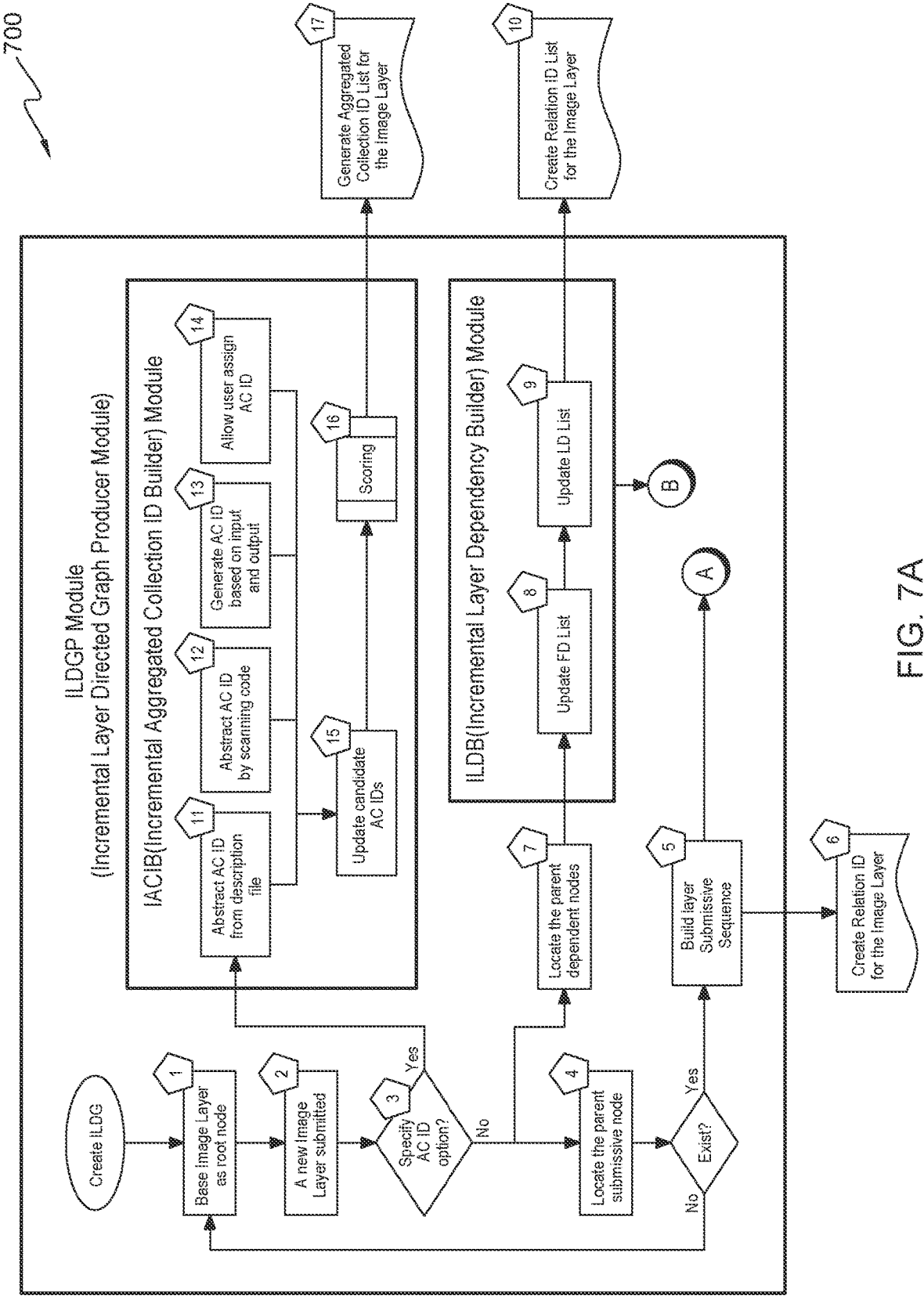
FIGS. 7A and 7B depict a flowchart representing operational steps pulling image layers on demand represented by certain modules, in accordance with an embodiment of the present invention.
Figure 7B:
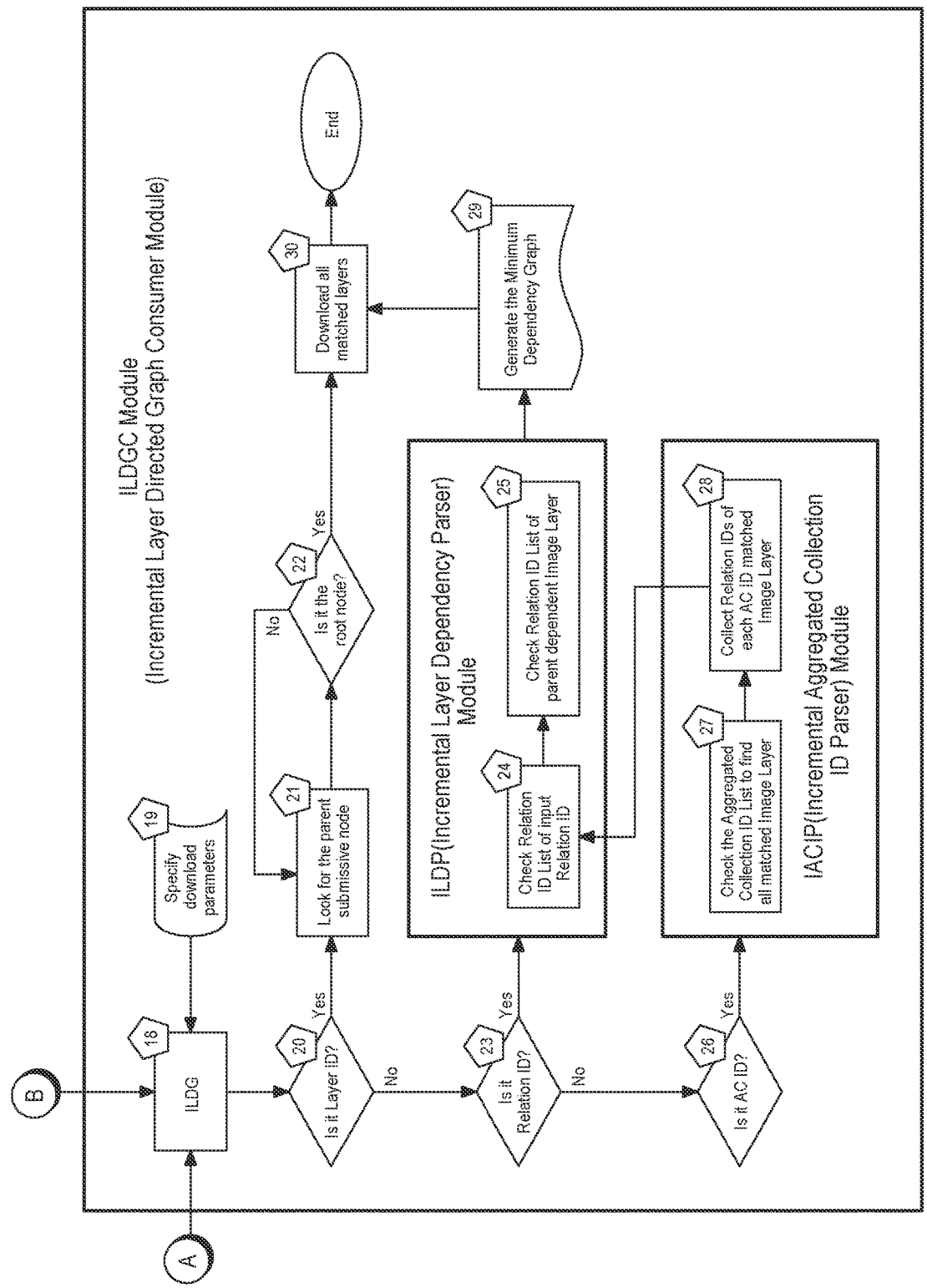

FIGS. 7A and 7B is a flowchart 700 depicting operational steps pulling image layers on demand represented by certain modules, in accordance with an embodiment of the present invention.

FIG. 7A depicts a flowchart 700 of graph driver 110 utilizing an incremental layer directed graph producer module to perform certain aspects of an embodiment of the present invention.

To create an incremental layer directed graph, in step 1, incremental layer directed graph producer (ILDGP) module 120 sets the base image layer as a root node.

In step 2, ILDGP module 120 submits a new layer to the base image layer.

In step 3, ILDGP module 120 can specify an aggregated collection (AC) ID option. If, in step 3, ILDGP module 120 specifies an AC ID option, then in step 11, incremental aggregated collection ID builder (IACIB) module 122 abstracts the AC ID from description files, abstracts the AC ID by scanning code (step 12), generates an AC ID for the image layer based on respective inputs and outputs (step 13). Optionally, in step 14, IACIB module 122 can allow for a user to assign an AC ID.

In step 15, IACIB module 122 can receive outputs from steps 11-14 and update candidate AC IDs.

In step 16, IACIB module 122 can score the respective AC IDs and, in step 17 generate an aggregated collection ID list for the respective image layer.

If, in step 3, ILDGP module 120 does not receive an AC ID option (i.e., does not specify an AC ID option), then in step 4, ILDGP module 120 locates the parent submissive node and locates the parent dependent nodes (step 7). If, in step 4, ILDGP module 120 cannot locate the parent submissive node, then processing reverts to step 1 to use the new image layer as the base image layer as the root node. If, in step 4, ILDGP module 120 can locate the parent submissive node, ILDGP module 120 builds a layer submissive sequence in step 5. ILDGP module 120 can then create a relation ID for the image layer in step 6.

In response to locating the parent dependent nodes (step 7) and locating any parent submissive nodes, incremental layer dependency builder (ILDB) module 124 updates the file dependency list in step 8. ILDB module 124 can then, in step 9 update the layer dependency list. ILDB module 124 creates a relation ID List using the updated file dependency, land layer dependency lists for the image layer in step 10.

Graph driver 110 can then generate the incremental layer directed graph (ILDG) from the created relation ID list and the generated collection ID list as discussed in greater detail with respect to FIG. 7B.

FIG. 7B depicts a flowchart 700 of graph driver 110 utilizing an incremental layer directed graph consumer module to perform certain aspects of an embodiment of the present invention.

In response to receiving specified download parameters (e.g., step 19), incremental layer directed graph consumer (ILDGC) module 126 creates the incremental layer directed graph (ILDG) in step 18. For example, ILDGC module 126 can receive user parameters (i.e., Layer ID, Relation ID, or AC ID) for downloading image layers before proceeding to step 18.

In step 20, ILDGC module 126 identifies a layer ID from the specified download parameters. If, in step 20, ILDGC module 126 identifies a layer ID from the specified download parameters, then in step 21, ILDGC module 126 looks for the parent submissive node in step 21. In step 22, ILDGC module 126 identifies the root node that matches the specified download parameters. If, in step 22, ILDGC module 126 identifies the root node that matches the specified download parameters, then in step 30, ILDGC module 126 can download all the matched layers. If, in step 22, ILDGC module 126 cannot identify the root node that matches the specified download parameter, ILDGC module 126 looks for the parent submissive node (i.e., step 21).

If, in step 20, ILDGC module 126 does not identify a layer ID from the specified download parameters, then in step 23, ILDGC module 126 can identify a relation ID from the specified download parameters that matches the specified download parameters. If, in step 23, ILDGC module 126 identifies a relation ID that matches the specified download parameters, then in step 24, incremental layer dependency parser (ILDP) module 130 can check the relation ID list against the input relation ID to identify a stored layer that matches the relation ID of the request (i.e., input relation ID). In step 25, ILDP 130 checks the relation ID list of parent dependent image layer. Processing can then continue to step 29 where ILDGC module 126 generates the minimum dependency graph which contains all AC ID layers and dependency layers. ILDGC module 126 can then download all the matched layers in step 30.

If, in step 23, ILDGC module 126 cannot identify a relation ID from the specified download parameters, then in step 26, ILDGC module 126 identifies an AC ID from the specified download parameters. In other words, if ILDGC module 126 does not recognize that the received ID from the user parameters is an AC ID but not a layer ID or a relation ID, processing proceeds to step 27. Incremental aggregated collection ID parser (IACIP) module 128 checks the aggregated collection ID list to find all matched layers in step 27. For example, continuing previous examples, IACIP module 128 can reference the aggregated collection ID list of Layer 4 to find Layer 1. IACIP module 128 can then collect relation IDs of each AC ID matched image layer in step 28. In other words, among the image layers (e.g., AC ID matched), IACIP module 128 can collect relation IDs in order to find dependencies. Processing can then proceed to step 24 to check the relation ID list of the received relation ID (from the specified download parameters). For example, IACIP module 128 can identify that layer 4 has a dependency with layer 3 since the relation ID list of Layer 4 contains a matching dependency. Processing then proceeds to step 25, ILDP 130 checks the relation ID list of parent dependent image layer. Processing can then continue to step 29 where ILDGC module 126 generates the minimum dependency graph which contains all AC ID layers and dependency layers. ILDGC module 126 can then download all the matched layers in step 30.

Figure 8:
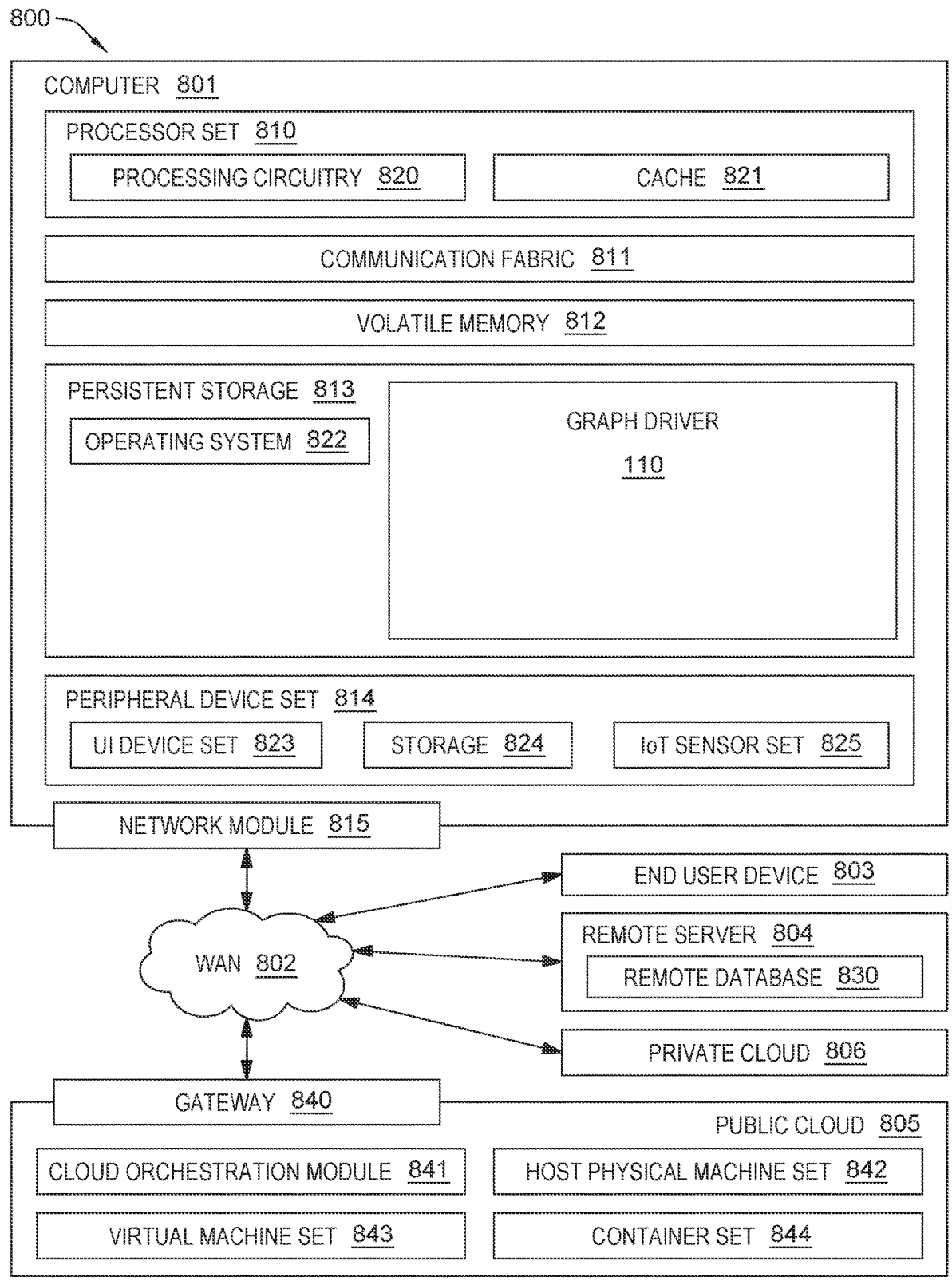
FIG. 8 is a block diagram of an alternate computing environment, in accordance with an embodiment of the present invention.

FIG. 8 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as graph driver 110 (also referred to as block 110) which continuously reconciles desired states and provides polymorphous intent based management as discussed previously with respect to FIGS. 2-3.

In addition to block 110, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 110, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 420 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 110 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 424 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

What is claimed is:

1. A computer-implemented method comprising:
   assigning an identifier that specifies a number of resources and a category associated with a respective image layer of a plurality of image layers;
   in response to receiving a user request, identifying image layers of the plurality of image layers that match the identifier based on dependencies between the plurality of image layers, wherein the identifying further comprises:
   generating a dependency graph using submissive and dependent sequences, wherein the generating further comprises:
   creating a dependency between a layer of the plurality of image layers and at least one layer committed after the layer; and
   creating a dependency between the layer and the at least one layer based on functionality of the at least one layer modifying the layer; and
   downloading matched layers based on functionality of respective image layers and the dependencies of those respective image layers.

2. The computer-implemented method of claim 1, further comprising:
   generating a list that represent a number of resources associated with the respective image layers comprising respective identifiers.

3. The computer-implemented method of claim 2, further comprising:
   detecting how many resources are associated with respective image layers of the plurality of image layers using the generated list.

4. The computer-implemented method of claim 1, further comprising:
   parsing the generated list and selecting image layers represented in the dependency graph that match the user request as results that satisfy the user request.

5. The computer-implemented method of claim 4, further comprising:
   building a minimum dependency graph by analyzing parent and dependent nodes of each selected image layer.

6. The computer-implemented method of claim 1, wherein an identifier is a form of character strings that represents a number of resources associated with a respective image layer and resource category.

7. A computer program product comprising:
   one or more computer readable storage media and program instructions stored on the one or more computer readable storage media, the program instructions comprising:
   program instructions to assign an identifier that specifies a number of resources and a category associated with a respective image layer of a plurality of image layers;
   program instructions to, in response to receiving a user request, identify image layers of the plurality of image layers that match the identifier based on dependencies between the plurality of image layers, wherein the identifying further comprises:
   generating a dependency graph using submissive and dependent sequences, wherein the generating further comprises:
   creating a dependency between a layer of the plurality of image layers and at least one layer committed after the layer; and
   creating a dependency between the layer and the at least one layer based on functionality of the at least one layer modifying the layer; and
   program instructions to download matched layers based on functionality of respective image layers and the dependencies of those respective image layers.

8. The computer program product of claim 7, wherein the program instructions stored on the one or more computer readable storage media further comprise:
   program instructions to generate a list that represent a number of resources associated with the respective image layers comprising respective identifiers.

9. The computer program product of claim 8, wherein the program instructions stored on the one or more computer readable storage media further comprise:
   program instructions to detect how many resources are associated with respective image layers of the plurality of image layers using the generated list.

10. The computer program product of claim 7, wherein the program instructions stored on the one or more computer readable storage media further comprise:
    program instructions to parse the generated list and selecting image layers represented in the dependency graph that match the user request as results that satisfy the user request.

11. The computer program product of claim 10, wherein the program instructions stored on the one or more computer readable storage media further comprise:
    program instructions to build a minimum dependency graph by analyzing parent and dependent nodes of each selected image layer.

12. A computer system comprising:
    one or more computer processors;
    one or more computer readable storage media; and
    program instructions stored on the one or more computer readable storage media for execution by at least one of the one or more computer processors, the program instructions comprising:
    program instructions to assign an identifier that specifies a number of resources and a category associated with a respective image layer of a plurality of image layers;
    program instructions to, in response to receiving a user request, identify image layers of the plurality of image layers that match the identifier based on dependencies between the plurality of image layers, wherein the identifying further comprises:
    generating a dependency graph using submissive and dependent sequences, wherein the generating further comprises:

creating a dependency between a layer of the plurality of image layers and at least one layer committed after the layer; and creating a dependency between the layer and the at least one layer based on functionality of the at least one layer modifying the layer; and program instructions to download matched layers based on functionality of respective image layers and the dependencies of those respective image layers.

13. The computer system of claim 12, wherein the program instructions stored on the one or more computer readable storage media further comprise:

program instructions to generate a list that represent a number of resources associated with the respective image layers comprising respective identifiers.

14. The computer system of claim 13, wherein the program instructions stored on the one or more computer readable storage media further comprise:

program instructions to detect how many resources are associated with respective image layers of the plurality of image layers using the generated list.

\* \* \* \* \*